L. N. REBIDEAU.
LID HOLDER.
APPLICATION FILED JUNE 21, 1921.
1,429,630. Patented Sept. 19, 1922.
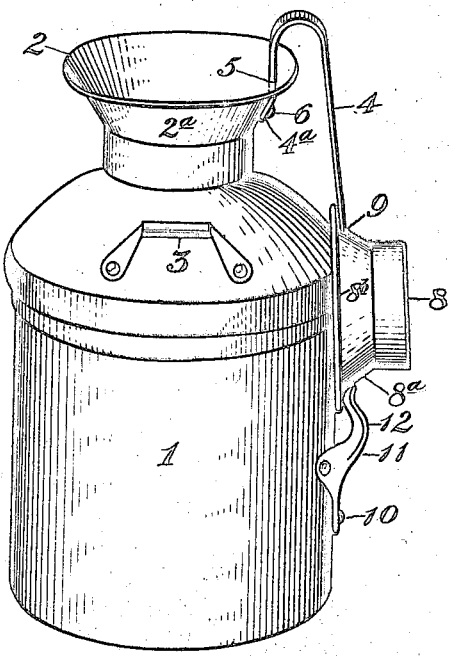
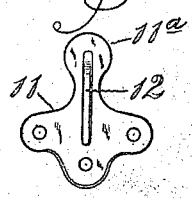
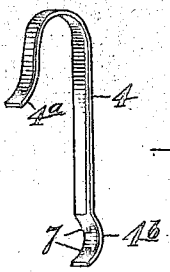
INVENTOR.
Louis N. Rebideau
BY E. E. Overholt
ATTORNEY.

Patented Sept. 19, 1922.

1,429,630

UNITED STATES PATENT OFFICE.

LOUIS N. REBIDEAU, OF BASIN, WYOMING.

LID HOLDER.

Application filed June 21, 1921. Serial No. 479,224.

*To all whom it may concern:*

Be it known that I, LOUIS N. REBIDEAU, a citizen of the United States, residing at Basin, in the county of Big Horn and State of Wyoming, have invented certain new and useful Improvements in Lid Holders, of which the following is a specification.

My invention relates to covered receptacles of different kinds not having their lids hinged thereto, and includes milk cans, and canisters such as are commonly used for coffee, tea, and the like, and various other receptacles.

My object is to provide means for holding the lids of the receptacles from being entirely separated therefrom, said means being also adapted at the same time to form handles for the receptacles.

In the matter of milk cans especially, great inconvenience and annoyance is experienced in connection with the lids which are constantly getting misplaced and exchanged for lids of different sizes, to say nothing of frequently getting lost or destroyed in handling and transportation.

A leading feature of the invention consists of a vertical handle at the top of the receptacle with the lid of the receptacle movably held thereupon.

The invention consists in certain novel features of construction and arrangement of parts, as will be hereinafter described and claimed, reference being had to the accompanying drawings, in which:—

Fig. 1 is a view showing my invention applied to a milk can, with the lid held in its inoperative position on the can. Fig. 2 is a plan view of the spring finger which cooperates with the handle to hold the lid in said position; and, Fig. 3 is a perspective view of said combined handle and lid support.

Referring further to the drawings, the numeral 1 indicates a milk can having the usual flared top 2, and a pair of ordinary handles 3. The combined vertical handle and lid support 4 is provided with a curved upper end portion which passes down through an opening 5 in one side of the flared mouth of the can, and terminates in a section 4ª bent to lie in flat engagement with the outer inclined face 2ª of the flared mouth 2, as illustrated in Fig. 1. Said section 4ª is soldered to the section 2ª of the can and also in the opening 5, and is further secured to the section 2ª by means of a rivet 6. The lower end of the handle is provided with a bent portion 4ᵇ adapted to fit the upper portion of the body of the can and is soldered thereto. It is also provided with one or more openings 7, so that in addition to soldering it can also be riveted to the can.

In coffee and tea canisters and other small receptacles, the rivets will not be necessary at the ends of the handle 4, as the soldering will be quite sufficient for securing purposes.

The lid 8 of the can is provided in its flared portion 8ª with an opening 9 adapted to easily receive the handle 4, and has an annular flange 8ᵇ around its top edge.

Suitably secured to the lower part of the can by means of rivets 10 or otherwise is a spring clip 11 having its upper free end 11ª bent to engage the annular flange 8ª of the lid when the same is in its lowermost position, as illustrated in Fig. 1. The clip is preferably provided with a strengthening rib 12.

For canisters and other small receptacles, the handles 3 are omitted, as the handle 4 serves every purpose of a handle, since the device may be handled as conveniently thereby as if it were a pitcher or a jug.

In operation, the lid is moved upwardly to the top of the handle 4 and turned over onto the top of the receptacle to close the same. When it is desired to open the can for pouring out the milk, the lid is brought down into the position illustrated in Fig. 1, with its rim 8ᵇ forced under the free upper end of the spring clip, which securely holds the lid in its inoperative position till it is forcibly removed therefrom.

The device is strong, simple and durable, and the can is as easy to handle as is an ordinary can, and in some respects more convenient because of the handle 4.

The clip 11 securely holds the lid 8 in its inoperative position even when the can is turned upside down.

Having now described my invention, what I claim as new and desire to protect by Letters Patent is:—

1. In combination, a receptacle formed of rigid material having at its upper end a reduced neck portion with a flared upwardly opening mouth, of a lid having a lower portion adapted to fit inside the neck of the can and a rigid upwardly extending portion adapted to fit the inside diameter of the flared mouth of the can, said rigid flared portion of the lid having an opening in one side thereof; a vertical member passing through said opening and secured at its upper end to the flared mouth of the can underneath the opening in the flared part of the lid to hold said flared part of the lid against rotation on the flared mouth of the can when the two are in operative relation to each other, said vertical member being curved outwardly at a point above the lid and then turned downwardly with its lower end secured to the body of the can to support the lid for upward and downward movement on said vertical member, the upper end of said vertical member being suitably arranged for guiding the lid into operative position on the can to cause the flared part of the lid to always come into the same relative position to the flared top of the can when put upon the can, whereby when the flared top of the can and the flared part of the lid are once perfectly fitted to each other they will always be guided into the same relative position to each other when the lid is placed on the can.

2. In a device of the character described, the combination with the receptacle of a lid having an opening in one side thereof; a handle secured to the top of the can and passing upwardly through said opening and then curved outwardly and downwardly and secured at its lower end to the body of the can to movably support the lid on said handle and to adapt it to move upwardly and downwardly thereupon, the upper end of the handle being arranged for holding the lid against rotation thereon and for guiding the lid up and down into operative and inoperative position on the can; and means for engaging and holding the lid in its lowermost position on the handle.

3. In combination, a receptacle made of rigid material and having its upper end formed into a reduced neck portion with a flared upwardly opening month, of a lid having a lower portion adapted to fit inside the neck of the can and a rigid upwardly extending portion adapted to fit the inside diameter of the flared mouth of the can, said rigid flared portion of the lid having an opening in one side thereof; a vertical member passing through said opening and secured at its upper end to the flared mouth of the can underneath the opening in the flared part of the lid to hold the lid against rotation on the can when in its normal position thereon, said vertical member being secured at its lower end to the body of the can to support the lid for upward and downward movement on said vertical member; the upper end of said vertical member being also arranged for guiding the lid upwardly and downwardly into operative and inoperative position on the can; and a spring clip secured on the can below the lower end of said vertical member and having a free end adapted to engage the edge of the flared portion of the lid at the side thereof diametrically opposite the opening therein for the vertical member, when the lid has been moved to the lower end of the vertical member.

In testimony whereof I affix my signature

LOUIS N. REBIDEAU.